US008326678B1

(12) United States Patent
Matvey et al.

(10) Patent No.: US 8,326,678 B1
(45) Date of Patent: Dec. 4, 2012

(54) CUSTOMER IMPACT MEASURING SYSTEM

(75) Inventors: David Matvey, Charlotte, NC (US);
John Lawton Cowan, Charlotte, NC (US); Tracey Leigh Bentley, Huntersville, NC (US); David Lee Harris, Huntersville, NC (US)

(73) Assignee: Bank of America Corporation, Charlotte, NC (US)

( * ) Notice: Subject to any disclaimer, the term of this patent is extended or adjusted under 35 U.S.C. 154(b) by 975 days.

(21) Appl. No.: 12/261,938

(22) Filed: Oct. 30, 2008

(51) Int. Cl.
*G06Q 10/00* (2006.01)

(52) U.S. Cl. ........................................ 705/7.38

(58) Field of Classification Search ............... 705/7.38
See application file for complete search history.

(56) References Cited

U.S. PATENT DOCUMENTS

| | | | |
|---|---|---|---|
| 6,349,290 B1 * | 2/2002 | Horowitz et al. | 705/35 |
| 6,490,698 B1 * | 12/2002 | Horvitz et al. | 714/46 |
| 6,862,351 B2 * | 3/2005 | Taylor | 379/221.06 |
| 6,885,641 B1 * | 4/2005 | Chan et al. | 370/252 |
| 7,020,621 B1 * | 3/2006 | Feria et al. | 705/7.29 |
| 7,546,039 B1 * | 6/2009 | Boroditsky et al. | 398/152 |
| 7,616,654 B2 * | 11/2009 | Moran et al. | 370/431 |
| 8,065,177 B2 * | 11/2011 | Puccio et al. | 705/7.28 |
| 2003/0158924 A1 * | 8/2003 | DeLegge | 709/223 |
| 2007/0239495 A1 * | 10/2007 | Osborn et al. | 705/7 |
| 2009/0030711 A1 * | 1/2009 | Puccio et al. | 705/1 |
| 2011/0295654 A1 * | 12/2011 | Waldron et al. | 705/7.38 |
| 2012/0053994 A1 * | 3/2012 | Cowan et al. | 705/7.38 |

OTHER PUBLICATIONS

McKenzie, Dr. Lehr. Higher Standards: Bank of America Setting the Benchmark for Measurement and Management of Customer Satisfaction and Customer Value. Apr. 2, 2005.*
Caropreso, Ronnie; Paxton, Richard. Bank of America—Delivering World-Class IT Service and Support—ITIL and Six Sigma. 2004.*
Allen, Julia. Carnegie Mellon Software Engineering Institute. "Governing for Enterprise Security." Jun. 2005.
Carnegie Mellon Software Engineering Institute. "Cert Podcasts: Security for Business Leaders: Show Notes." Web. Oct. 17, 2006; http__www.cert.org_podcast_notes_1leaders_care.pdf.
Six Sigma. "Scorecard Can Balance Different Measures of Success." Web. Oct. 18, 2006; http__www.isixsigma.pdf.
Hinkley, Craig. Bank of America. "Telecommunications & e-Interactions, The Virtual Enterprise." May 2007. eCommerce & Telecom Presentation-vl.
MIT CIO Symposium—Financial Services Panel Notes—"Customer Experience" & "Focus." Web. May 21, 2008; http_steinthal.wordpress.pdf.

* cited by examiner

*Primary Examiner* — Johnna Loftis
(74) *Attorney, Agent, or Firm* — Michael A. Springs; Moore & Van Allen PLLC; Padowithz Alce

(57) ABSTRACT

Systems, methods, and computer program products are provided for monitoring the daily performance, as measured by customer impact, of technology systems that interface between a company and its customers. To do so, for example, embodiments of the present invention record, on a daily basis, the number of failed interactions between the company's customers and its technology systems, and, based on the recorded number of failed interactions, embodiments of the present invention provide performance measurements of the company's technology systems.

47 Claims, 5 Drawing Sheets

| CHANNEL WEIGHTING | CHANNEL | SUBCHANNEL WEIGHTING | SUB CHANNEL | |
|---|---|---|---|---|
| 30% | CARD 120a | 30% | CARD OPERATIONS | 124a |
| | | 30% | LOSS PREVENTION & FRAUD | 124b |
| | | 30% | NORTH AMERICA CARD | 124c |
| | | 10% | INTERNATIONAL CARD | 124d |
| 50% | E-COMMERCE 120b | 50% | ONLINE BANKING | 124e |
| | | 40% | DOTCOM | 124f |
| | | 10% | E-COMMERCE | 124g |
| 20% | BANKING CENTER 120c | 50% | PLATFORM | 124h |
| | | 50% | TELLER | 124i |
| | | 0% | LEADS | 124j |

FIG. 2

CUSTOMER IMPACT MEASURING SYSTEM

FIELD

In general, embodiments of the invention relate to systems, methods, and computer program products for measuring the performance of technology systems.

BACKGROUND

There are a variety of companies that use technology systems to provide services to, and communicate with, customers and potential customers. A good example of this type of company is a global consumer bank, where a large percentage of services and products are provided using technology systems. For example, many banks have various business channels, such as a credit-card channel, an e-commerce channel, an ATM channel, and a banking center channel. In many cases, each of the channels employs unique technology systems to provide services and products to customers. For example, the e-commerce channel employs online banking technologies, where customers can access their checking accounts, saving accounts, credit-card accounts and brokerage accounts via the internet. The online banking technology systems employed by the e-commerce channel are considerably different than the ATM technology systems employed by the ATM channel or the teller technology systems employed by the banking center channel.

Any one of these channels may have implemented performance monitoring systems and procedures to measure the performance of its own technology systems. However, because the technology systems of the various divisions are different, it is difficult to provide accurate and reliable performance comparisons and aggregations across the various divisions.

SUMMARY

Systems, methods, and computer program products are provided for monitoring the daily performance, as measured by customer impact, of technology systems that interface between a company and its customers. To do so, for example, embodiments of the present invention record, on a daily basis, the number of failed interactions between the company's customers and its technology systems, and, based on the recorded number of failed interactions, embodiments of the present invention provide performance measurements of the company's technology systems.

Embodiments of the present invention provide a method for measuring the performance of a company's technology systems, the company comprising at least two channels and each of the channels employs a technology system, the method comprising weighting the importance of each of the channels; receiving a number of failed interactions, wherein each of the failed interactions represents an instance where the technology system of one of the channels failed to properly execute; and normalizing a magnitude of customer impact resulting from the failed interactions based on the channel in which the failed interactions occurred. In one embodiment of the present invention, the method is measured on a daily basis. In another embodiment, the method measures the magnitude of customer impact, the customer impact being the extent of negative impact on a customer of the company caused by the failed interactions. In yet another embodiment, the method measures a company's technology systems' performance by weighting the importance of each of the channels, which comprises assigning a channel-weighting factor to each of the channels, wherein the channel-weighting factors reflect the relative importance of the channels to the company. In further embodiments of the present invention, the method normalizes the magnitude of customer impact resulting from the failed interactions comprising translating the number of failed interactions into a normalized-impact score for each channel. In one embodiment, translating the number of failed interactions into the normalized-impact score is based on a normalized-impact scale that, for each of the channels, provides a numerical range of failed interactions and the corresponding customer-impact score. In another embodiment, the normalized-impact scores account for the disparity of the magnitude of customer impact across the different channels resulting from failed interactions. In one embodiment, the method further comprises determining a performance indicator for each of the channels based on the normalized-impact score of the respective channels. In another embodiment, the performance indicator is a color. In one embodiment, the performance indicator is green when the normalized-impact score for the channel is low, which indicates that a low number of failed interactions occurred in the channel and that the technology system of the channel is performing at a high level. In yet another embodiment, the performance indicator is yellow when the normalized-impact score for the channel is medium, which indicates that a medium number of failed interactions occurred in the channel and that the technology system of the channel is performing at a medium level. In one embodiment, the performance indicator is red when the normalized-impact score for the channel is high, which indicates that a high number of failed interactions occurred in the channel and that the technology system of the channel is performing at a low level. In another embodiment, the method further comprises calculating an aggregate-impact score that reflects the overall performance of the technology systems of all of the channels of the company. In one embodiment, the aggregate-impact score is the sum of the product of the normalized-impact score and the channel-weighting factor of each of the channels. In another embodiment, the method further comprises providing an overall performance indicator for the technology systems of the company, wherein the overall performance indicator is based on the aggregate-impact score. In yet another embodiment, the method further comprises calculating the percentage of days per month that the performance indicator is green for each channel. In another embodiment, the method further comprises creating a scorecard that presents the overall performance of the technology systems of the company. In one embodiment, the scorecard presents the number of failed interactions for each channel, the performance indicator for each channel, and the percentage of days per month that the performance indicator is green for each channel. In another embodiment, the scorecard presents the number of failed interactions for the company, the performance indicator for the company, and the percentage of days per month that the performance indicator is green for the company.

In an exemplary embodiment of the present invention, an apparatus is provided for measuring the performance of a company's technology systems, the company comprising at least two channels and each of the channels employs a technology system, the method comprising a channel-weighting factor calculator configured to weight the importance of each of the channels; a database configured to receive a number of failed interactions, wherein each of the failed interactions represents an instance where the technology system of one of the channels failed to properly execute; and a normalized-impact score calculator configured to normalize a magnitude of customer impact resulting from the failed interactions based on the channel in which the failed interactions occurred. In one embodiment, the apparatus measures the performance of the company's technology systems on a daily basis. In one embodiment, the magnitude of customer impact is the extent of negative impact on a customer of the company caused by the failed interactions. In one embodiment, a channel-weighting factor calculator is configured to assign a channel-weighting factor to each of the channels, wherein the channel-weighting factors reflect the relative importance of the channels to the company. In one embodiment, the normalized-impact score calculator is configured to translate the number of failed interactions into a normalized-impact score for each channel based on a normalized-impact scale that, for each of the channels, provides a numerical range of failed interactions and the corresponding customer-impact score. In one embodiment, the normalized-impact scores account for the disparity of the magnitude of customer impact across the different channels resulting from failed interactions. In one embodiment, the normalized-impact score calculator is further configured to determine a performance indicator for each of the channels based on the normalized-impact score of the respective channels. In one embodiment, the performance indicator is a color. In one embodiment, the apparatus further comprises an aggregate-impact score calculator configured to calculate an aggregate-impact score that reflects the overall performance of the technology systems of all of the channels of the company. In one embodiment, the aggregate-impact score calculator is further configured to provide an overall performance indicator for the technology systems of the company, wherein the overall performance indicator is based on the aggregate-impact score. In one embodiment, the apparatus further comprises a scorecard creator configured to calculate the percentage of days per month that the performance indicator is green for each channel. In another embodiment, the apparatus further comprises a scorecard creator configured to create a scorecard that presents the overall performance of the technology systems of the company. In one embodiment, the scorecard presents the number of failed interactions for each channel, the performance indicator for each channel, and the percentage of days per month that the performance indicator is green for each channel. In one embodiment, the scorecard presents the number of failed interactions for the company, the performance indicator for the company, and the percentage of days per month that the performance indicator is green for the company.

In another exemplary embodiment of the present invention, a computer program product is provided for measuring the performance of a company's technology systems, the company comprising at least two channels and each of the channels employs a technology system, the computer program product comprising a computer-readable medium having computer-readable program instructions stored therein, wherein said computer-readable program instructions comprise first instructions configured to weight the importance of each of the channels; second instructions configured to transmit a number of failed interactions to a database, wherein each of the failed interactions represents an instance where the technology system of one of the channels failed to properly execute; and third instructions configured to normalize a magnitude of customer impact resulting from the failed interactions based on the channel in which the failed interactions occurred. In one embodiment, the first instructions are configured to assign a channel-weighting factor to each of the channels, wherein the channel-weighting factors reflect the relative importance of the channels to the company. In one embodiment, the third instructions are configured to translate the number of failed interactions into a normalized-impact score for each channel based on a normalized-impact scale that, for each of the channels, provides a numerical range of failed interactions and the corresponding customer-impact score. In one embodiment, the third instructions are further configured to determine a performance indicator for each of the channels based on the normalized-impact score of the respective channels. In one embodiment, the computer program product further comprises fourth instructions configured to calculate an aggregate-impact score that reflects the overall performance of the technology systems of all of the channels of the company. In one embodiment, the fourth instructions are further configured to provide an overall performance indicator for the technology systems of the company, wherein the overall performance indicator is based on the aggregate-impact score. In one embodiment, the computer program product further comprises fifth instructions configured to create a scorecard that presents the overall performance of the technology systems of the company. In one embodiment, the scorecard presents the number of failed interactions for each channel, the performance indicator for each channel, and a percentage of days per month that the performance indicator is green for each channel. In one embodiment, the scorecard presents the number of failed interactions for the company, the performance indicator for the company, and a percentage of days per month that the performance indicator is green for the company.

In another exemplary embodiment of the present invention, a system is provided for measuring the performance of a company's technology systems, the company comprising at least two channels and each of the channels employs a technology system, the method comprising an input system configured to receive a number of failed interactions, wherein each of the failed interactions represents an instance where the technology system of one of the channels failed to properly execute; a first processing system configured to weight the importance of each of the channels; and a second processing system configured to normalize a magnitude of customer impact resulting from the failed interactions based on the channel in which the failed interactions occurred. In one embodiment, the first processing system is configured to assign a channel-weighting factor to each of the channels, wherein the channel-weighting factors reflect the relative importance of the channels to the company. In one embodiment, the second processing system is configured to translate the number of failed interactions into a normalized-impact score for each channel based on a normalized-impact scale that, for each of the channels, provides a numerical range of failed interactions and the corresponding customer-impact score. In one embodiment, the second processing system is further configured to determine a performance indicator for each of the channels based on the normalized-impact score of the respective channels. In one embodiment, the system further comprises a third processing system configured to calculate an aggregate-impact score that reflects the overall performance of the technology systems of all of the channels of the company. In one embodiment, the third processing system is further configured to provide an overall performance indicator for the technology systems of the company, wherein the overall performance indicator is based on the aggregate-impact score. In one embodiment, the system further comprises a fourth processing system configured to create a scorecard that presents the overall performance of the technology systems of the company. In one embodiment, the scorecard presents the number of failed interactions for each channel, the performance indicator for each channel, and a percentage of days per month that the performance indicator is green for each channel. In one embodiment, the scorecard presents the number of failed interactions for the company, the performance indicator for the company, and a percentage of days per month that the performance indicator is green for the company.

BRIEF DESCRIPTION OF THE DRAWINGS

Figure 1:
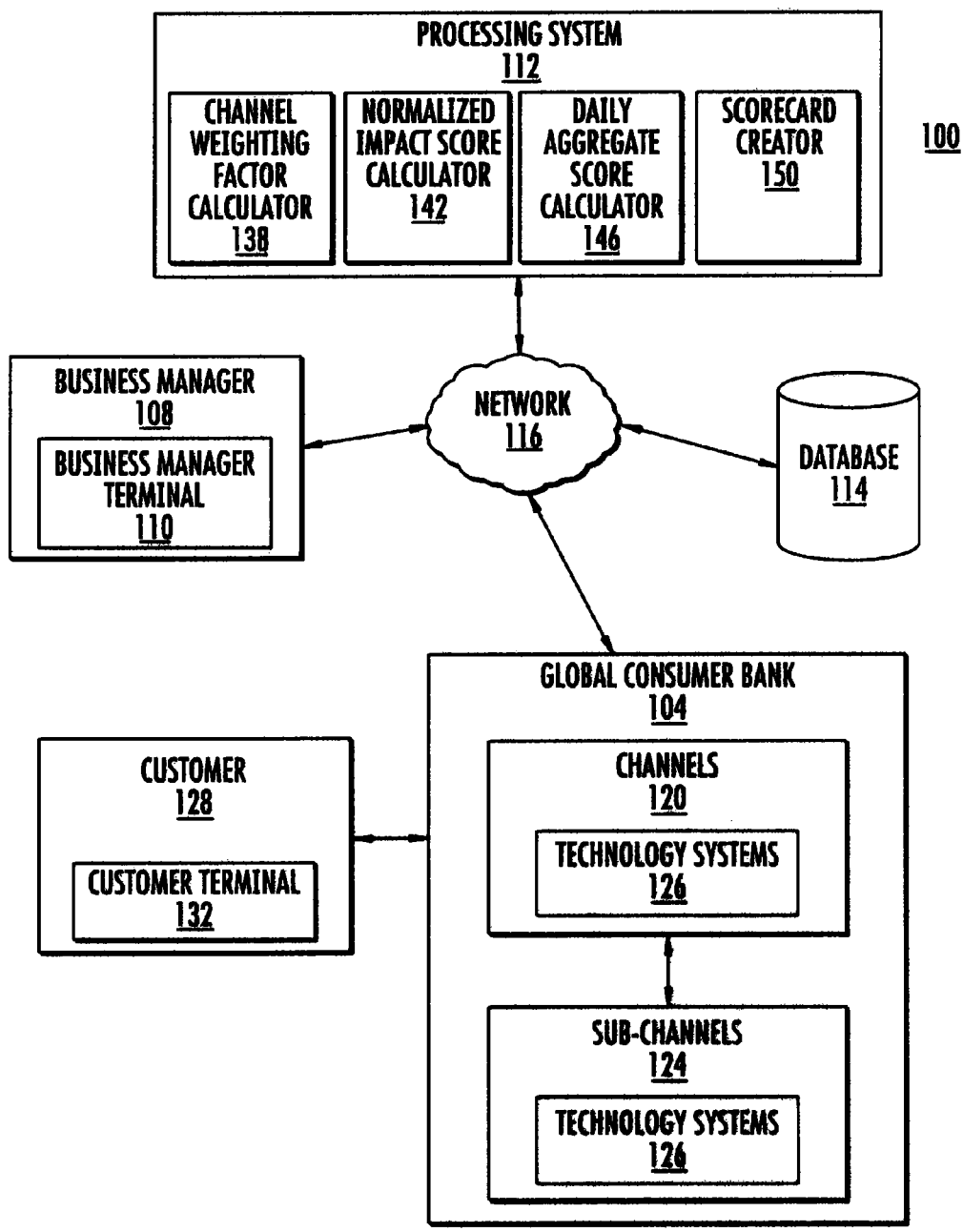
Figure 3:
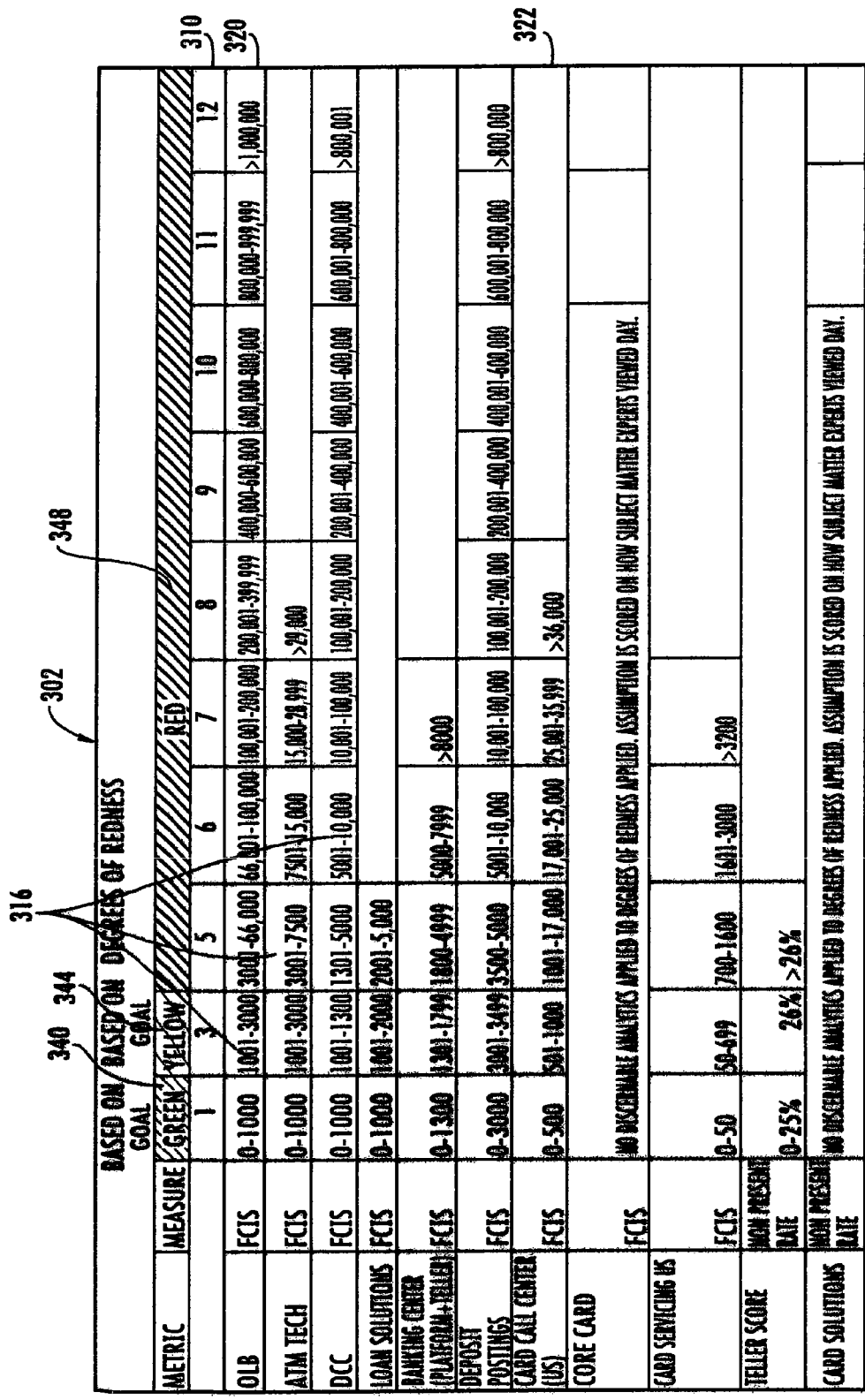
Figure 4:
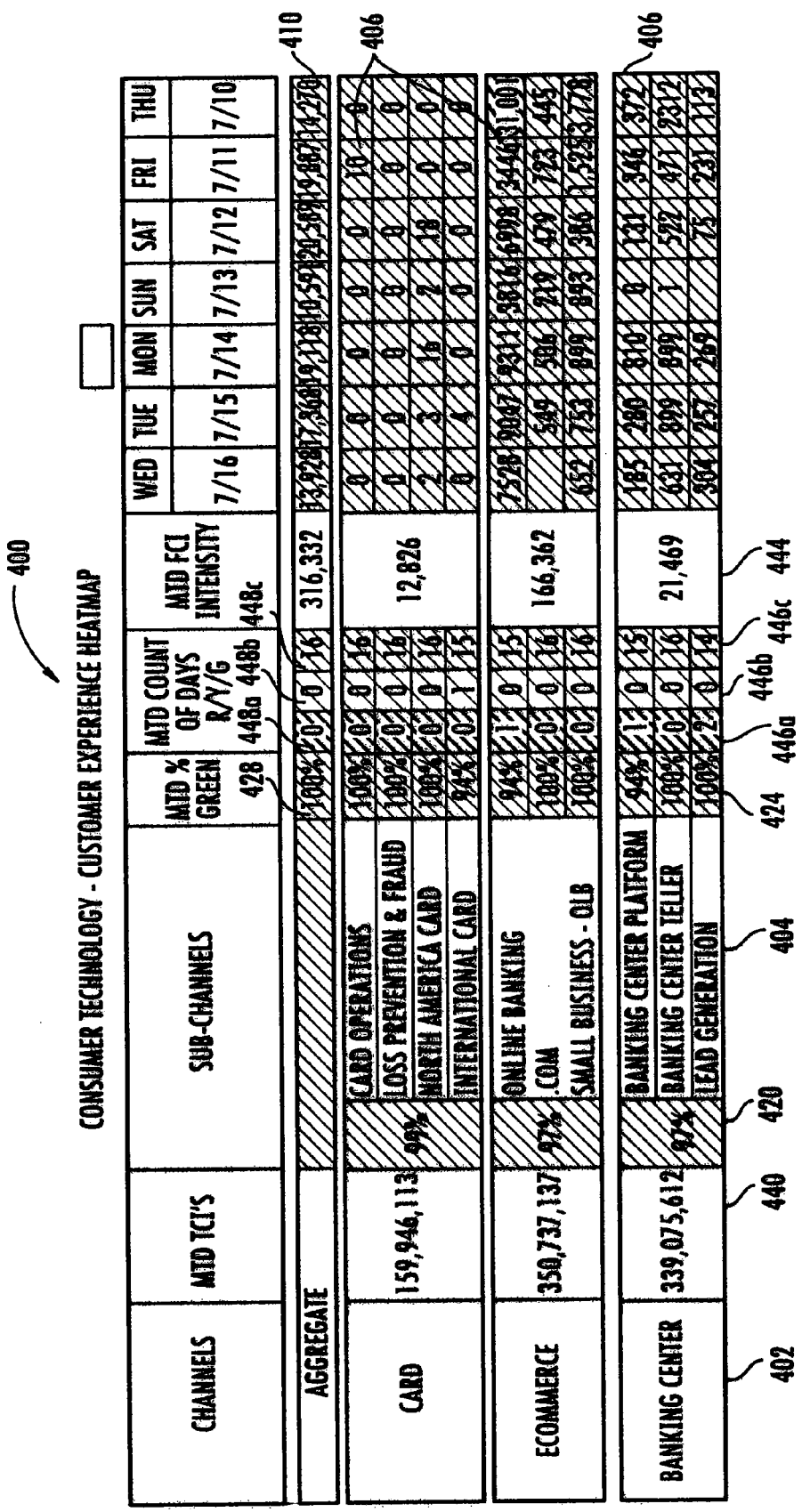
Figure 5:
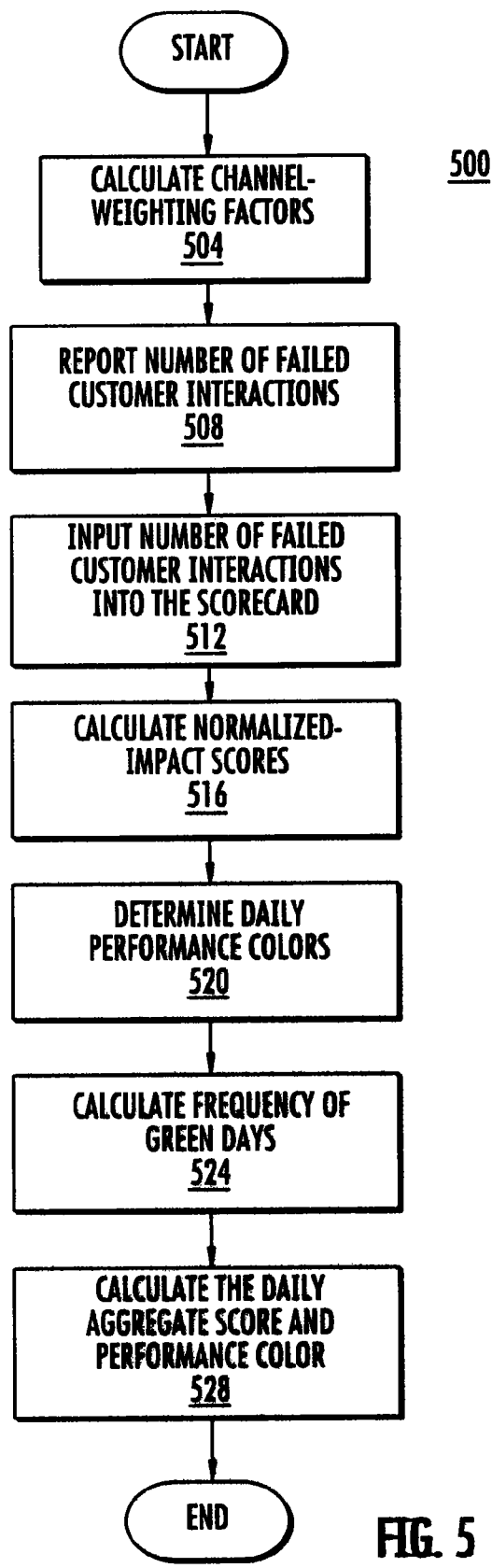

Having thus described embodiments of the invention in general terms, reference will now be made to the accompanying drawings, which are not necessarily drawn to scale, and wherein:

FIG. 1 illustrates an environment in which the processes described herein are implemented, according to one embodiment of the present invention;

FIG. 2 provides a table of exemplary channel-weighting factors, according to one embodiment of the present invention;

FIG. 3 provides a table of exemplary normalized-impact scores and performance colors, according to one embodiment of the present invention;

FIG. 4 is screenshot illustrating an exemplary output provided by a customer impact measuring system, according to one embodiment of the present invention; and FIG. 5 is a flow chart illustrating an exemplary process for operating the customer impact measuring system, according to an embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein unless the claims clearly indicate otherwise; rather, these embodiments are provided so that this disclosure will satisfy applicable legal requirements.

In general, embodiments of the present invention monitor the impact that a company's technology systems have on its customers and generate performance measurements regarding the same. To do so, for example, the present invention records, on a daily basis, the number of failed interactions between the company's customers and its technology systems, and, based on the recorded number of failed interactions, the present invention provides performance measurements of the company's technology systems. The company's business managers can use the performance measurements to, among other things, determine whether the company's already-invested technology dollars are invested in adequately-performing technology systems, and whether additional technology dollars should be invested to shore up or replace underperforming technology systems.

A brief operational overview of the present invention will now be provided. For illustrative convenience and for purposes of this brief overview, the present invention will be described as being employed by a company having multiple channels, e.g., lines of business, divisions, etc. The company's technology systems may differ among the different channels. That is, one channel may use one type of technology system, while another channel may use another type of technology system.

When employed in this exemplary company, embodiments of the present invention determine a channel-weighting factor for each of the company's channels. These channel-weighting factors reflect the relative importance of the various channels. Revenue, profit, and transaction volume, among other things, are considered when determining the importance of the respective channels. For example, companies typically place more importance on profitable channels and/or channels that conduct a large number of interactions/transactions with customers.

For example, if the company were a bank, the company's online banking channel would have high importance—and, accordingly, a high channel-weighting factor—because online banking is profitable and because banks' customers execute a large number of interactions/transactions online. Also, for many banks, online banking is a central interface between the bank and its customers. However, for many banks, ATM services are not as important as online banking because ATM services may not account for as much profit or may not account for as many customer interactions/transactions as online banking. Business channels that have high profits and transaction volume, e.g., online banking, have higher channel-weighting factors than channels that have lower profit and transaction volumes, e.g., ATM services. Objective and subjective assessments from the company's business managers may also contribute to determining channel-weighting factors.

After the channel-weighting factors are determined, embodiments of the present invention determine a normalized-impact score for each of the channels. The normalized-impact scores account for the magnitude of the impact felt by a customer when a failed interaction occurs between the customer and a technology system. An exemplary failed interaction is an event in which the company's technology system (s) fails to properly execute a customer's request. For example, if the company were a bank, an exemplary failed interaction occurs when a customer is unable to login to its online bank account. Business managers can develop custom definitions of what qualifies as a failed interaction for each of the respective channels. These custom definitions account for the particular characteristics of the various channels. In operation, according to one embodiment, each of the channels reports out the total number of failed interactions each day, and the present invention captures and records that information.

Due to the varying nature of the respective channels, a single failed interaction in one channel may have more of an impact on a customer than a single failed interaction in another channel. The normalized-impact scores account for the disparity in the customer impact among the different channels by normalizing the customer impact of a failed interaction. This normalizing enables the present invention to directly compare the customer impact of the technology systems in one channel with the customer impact of the technology systems in another channel based on the number of failed interactions in the respective channels.

An example will now be provided to illustrate the effect of normalized-impact scores. In this example, assume the company is a bank. As determined by the bank's business managers, one hundred failed interactions per day in the online-banking channel is considered acceptable, e.g., customers cannot access their online accounts because a server is temporarily down. However, because the resulting customer impact would be too large, one hundred failed interactions per day is considered unacceptable in the banking-center channel, e.g., the teller platform at a branch location is down and bank personnel cannot assist customers. This disparity in customer impact may be due to time and resources expended by customers when visiting a branch location outweighs time and resources expended by customers when attempting to access their online account.

Because a failed interaction in the banking-center channel has a greater impact than a failed interaction in the online-banking channel, the number of failed interactions that occur in the respective channels cannot be directly compared to determine which channel has more customer impact due to failed interactions. To put it another way, the respective numbers of failed interactions that occurred in the two different channels means different things and therefore cannot be directly compared to determine the performance of one channel's technology systems vis-à-vis the performance of another channel's technology systems. Accordingly, the present invention normalizes the impact of the failed interactions before comparing the customer impact of the technology systems of the two channels.

To do so, for example, embodiments of the present invention translate the number of failed interactions into a normalized-impact score. For example, the present invention translates the number of failed interactions into the normalized-impact scores based on a normalized-impact scale that, for each of the channels, provides a numerical range of failed interactions and a corresponding customer-impact score. In this example, the present invention translates the number of failed interactions for each channel into a normalized-impact score between "1" and "12". The customer-impact scale, on which these customer-impact scores are based, are provided in a table. For example, 0 to 1,000 failed customer interactions equals a normalized-impact score of "1" for a first channel, whereas 0 to 500 failed customer interactions equals a normalized-impact score of "1" for a second channel. Continuing with this example, 1,001 to 3,000 failed interactions equals a normalized-impact score of "2" for the first channel, whereas 501 to 1,000 equals a normalized-impact score of "2" for the second channel. In this example, a single failed interaction in the second channel has a greater customer impact than a single failed interaction in the first channel.

This normalization enables accurate computation of company-wide customer-impact measurements of the technology systems, and enables embodiments of the present invention to compare and contrast the measured customer impact of the respective channels. To compare and contrast the customer impact of the first and second channels, embodiments of the present invention would compare the normalized-impact scores of the respective channels, not the number of failures in each of the respective channels. For example, if the first and second channels both had 700 failed customer interactions for the day, the present invention would indicate that the first channel had a normalized impact score of "1" and that the second channel had a normalized-impact score of "2".

This indicates that failed interactions of the second channel had more customer impact than the failed interactions of the first channel. Accordingly, the first channel performed better than the second channel, and business management may consider investing new technology dollars to improve the technology systems of the second channel.

After determining the channel-weighting factors and the normalized-impact scores, embodiments of the present invention provide performance indicators based on the normalized-impact scores. In this example, the present invention provides three performance indicators: green, yellow, and red. Because the performance indicators are based on the normalized-impact scores, the parameters for determining the performance indicators are the same for each channel. For example, "1" to "2" is green, "3" to "4" is yellow, and "5" to "12" is red.

Green indicates that the channel's technology systems are performing well and have low customer impact. Yellow indicates that the channel's technology systems are performing at an acceptable level and have some negative customer impact. Business management may consider investing technology dollars in a "yellow" channel to shore up its technology systems. Red indicates that the channel's technology systems are performing poorly and have high negative customer impact. In the event a particular channel's technology systems have a "red" performance rating, business management may consider investing technology dollars in that channel to either shore up or replace the underperforming technology systems.

Embodiments of the present invention create an overall scorecard that presents performance information about each of the channels, and the company as a whole. Accordingly, the business managers can access the present invention to view the overall scorecard and obtain information relating to the individual performance of each of the channels and the overall performance of the entire company. That is, embodiments of the present invention provide business managers with a single tool that can be used to determine the overall performance of the company, and to compare and contrast the performance of the respective channels.

In one example, in addition to showing—per channel, per day—the number of failed interactions (if any) and the performance indicator, the overall scorecard provides the aggregate number of failed interactions across all channels and an overall-performance indicator, e.g., green, yellow, and red, that indicates the overall performance of the entire company. This performance indicator reflects the customer impact of the company's technology systems in the aggregate. For example, to determine the overall-performance indicator, the present invention first determines an aggregate-impact score based on the previously determined channel-weighting factors and normalized-impact scores.

The aggregate-impact score, in one example, is the sum of the products of the channel-weighting factor and the normalized-impact score of each channel. In this example, the present invention defines three ranges of aggregate-impact scores. These three ranges correspond to the three overall-performance colors: green, yellow, and red. For example, aggregate-impact scores from "0" to "2.59" correspond to green, aggregate-impact scores from "2.60" to "3.70" correspond to yellow, and aggregate-impact scores above "3.70" correspond to red. The overall scorecard, according to one embodiment, also provides the percentage of days per month/year that the performance of each of the channels has been green, the percentage of days per month/year that performance of the entire company has been green, the monthly/yearly total number of failed interactions that occurred in each of the channels, and the monthly/yearly total number of company-wide failed interactions.

Business managers can quickly glance at the overall scorecard and determine whether the company's already-invested technology dollars are properly allocated among the various channels and properly invested in adequately-performing technology systems. The business managers can also determine whether additional technology dollars should be invested to shore up or replace underperforming technology systems.

Embodiments of the present invention will now be described with reference to the figures, where like numbers refer to like elements throughout. Embodiments of the present invention are generally described herein as being employed to measure the performance of a global consumer bank having multiple channels and sub-channels. It should be appreciated, however, that other embodiments of the present invention may be employed in and/or administered by any individuals or business or non-business entities—other than global consumer banks—seeking to measure the performance of its technology systems by measuring the impact that its technology systems have on its customers.

FIG. 1 provides a block diagram illustrating a customer impact measuring system 100, in accordance with one embodiment of the present invention. As illustrated in FIG. 1, the customer impact measuring system 100 generally comprises a global consumer bank 104, a business manager 108, a processing system 112, and a database 114, all of which are communicably coupled via a communication network 116. It should be appreciated that the communication network 116 could be a wide area network, including the Internet, a local area network or intranet, a wireless network, etc. It should also be appreciated that when components are described herein as communicating over a network, the components may be directly coupled to each other or indirectly coupled via one or more other components.

Furthermore, although the customer impact measuring system 100 is described herein as comprising separate components, these components need not be separate and distinct from one another, and two or more of such components may, in some embodiments, be combined into a single component that performs all of the functions of the multiple components so combined as described herein. For illustrative convenience, embodiments of the present invention are described herein where the business manager 108 and the global consumer bank 104 constitute a part of the customer impact measuring system 100. It should be appreciated, however, that the customer impact measuring system 100 is not limited to a system that includes these components.

It should be appreciated that the global consumer bank 104, the business manager 108, and the processing system 112 could be part of the same entity. The business manager 108, for example, is a person or group of persons responsible for managing the global consumer bank 104. In the illustrated embodiment, the business manager 108 has access to the customer impact measuring system 100 via a business manager terminal 110 such that the business manager 108 can send and receive information to and from any of the components linked to the communication network 116.

In some embodiments, the processing system 112 and the database 114 are administered by the global consumer bank 104. However, it should be appreciated that the processing system 112 and/or the database 114 could be administered by a third-party entity. It should also be appreciated that the processing system 112 and the database 114 could be administered by the same third-party entity or different third-party entities.

Turning to the global consumer bank 104 (referred to herein as "the bank 104"). In the illustrated embodiment, the bank 104 includes multiple channels 120 and sub-channels 124. The channels 120 and sub-channels 124 each employ different technology systems 126 to provide services and products to customers 128, which access the bank 104 via a customer terminal 132. The multiple channels 120 and sub-channels 124 may have varying importance to the bank 104. Accordingly, the performance of technology systems 126 employed in high-importance channels 120 and sub-channels 124 should be weighted more heavily than the performance of technology systems 126 employed in low-importance channels 120 and sub-channels 124 when considering the overall performance of the bank's 104 technology systems 126. As described in more detail below, the processing system 112 is configured to calculate the appropriate weight of the various channels 120 and sub-channels 124.

Turning now to the processing system 112, which, according to the illustrated embodiment, generally comprises a channel-weighting factor calculator 138, a normalized-impact score calculator 142, a daily aggregate-score calculator 146, and a scorecard creator 150. Each of these components will be discussed in turn.

The channel-weighting factor calculator 138 calculates a channel-weighting factor for each of the channels 120 and sub-channels 124. These channel-weighting factors reflect the relative importance of the various channels 120 and sub-channels 124. For example, a business manager 108 accesses the channel-weighting factor calculator 138 via a business manager terminal 110 and inputs information regarding the revenue, profit, and transaction volume of the respective channels 120 and sub-channels 124. Based on the inputted information, the channel-weighting factor calculator 138 calculates the channel-weighting factors. It should be appreciated that the channel-weighting factor calculator 138 can automatically obtain this information, instead of the business manager 108 inputting the information. In one embodiment, objective and subjective assessments from the bank's 104 business manager 108 may also contribute to determining channel-weighting factors. For example, the business manager 108 can override the automatic calculation and manually assign channel-weighting factors. It should also be appreciated that, after the automatic calculation, the business manager 108 can manually adjust the channel-weighting factors.

Referring now to FIG. 2, a channel-weighting table 202 is provided that lists the various channels 120*a*-*c* and sub-channels 124*a*-*j* of the bank 104, according to an embodiment of the present invention. A channel-weighting factor is associated with each of the channels 120*a*-*c* and sub-channels 124*a*-*j* of the bank 104. The illustrated bank 104 includes a credit-card channel 120*a*, an e-commerce channel 120*b*, and a banking-center channel 120*c*. The channel-weighting factor calculator 138 calculated a channel-weighting factor for each of the channels 120 and sub-channels 124. These channel-weighting factors are listed in column 204. In the illustrated embodiment, as shown in FIG. 2, the channel-weighting factor calculator 138 calculated a channel-weighting factor of 30% for the credit-card channel 120*a*, 50% for the e-commerce channel 120*b*, and 20% for the banking-center channel 120*c*. Within each channel 120*a*-*c*, the channel-weighting factor calculator 138 calculates a channel-weighting factor for each sub-channel 124*a*-*j*. The channel-weighting factors for sub-channels 124 are provided in column 206.

These channel-weighting factors reflect the relative importance of the channels 120*a*-*c* and sub-channels 124*a*-*j*. For example, the e-commerce channel 120*b* has the highest importance—and, accordingly, a high channel-weighting factor of 50%—because the e-commerce channel 120*b* is the most profitable of the channels 120*a*-*c* and because customers 128 execute a large number of transactions in the e-commerce channel 120*b*. Also, for example, the online banking sub-channel 124*e* has the highest channel-weighting factor among the sub-channels 124*e*-*g* of the e-commerce channel 120*b*. This is because the online banking sub-channel 124*e* returns more profits than the other sub-channels 124*e*-*g* of the e-commerce channel 120*b* and because online banking is a central interface between the bank 104 and its customers 128, and if online banking goes down, the customer impact would be significant.

Referring now to the normalized-impact score calculator 142 of the processing system 112. Due to the varying nature of the respective channels 120 and sub-channels 124, a single failed interaction in one channel 120 or sub-channel 124 may have more or less of an impact on a customer 128 than a single failed interaction in another channel 120 or sub-channel 124. Accordingly, the processing system 112 includes a normalized-impact score calculator 142 that calculates a normalized-impact score for each of the channels 120 and sub-channels 124. These calculated normalized-impact scores account for the disparity in the customer impact among the different channels 120 and sub-channels 124 by normalizing the customer impact of a single failed interaction. This normalizing enables the customer impact measuring system 100 to directly compare the customer impact of the technology systems 126 in one channel 120 or sub-channel 124 with the customer impact of the technology systems 126 in other channels 120 or sub-channels 124 based on the number of failed interactions in the respective channels 120 and sub-channels 124.

In an embodiment, the normalized-impact score calculator 142 calculates a normalized-impact score for each of the channels 120 and sub-channels 124 based on the impact that a failed interaction would have on the customer 128. To do so, in the illustrated embodiment, the normalized-impact score calculator 142 translates the number of failed interactions for each channel 120 and sub-channel 124 into a normalized-impact score that ranges between "1" and "12". For example, the normalized-impact score calculator 142 translates the number of failed interactions into the normalized-impact scores based on a normalized-impact scale that, for each of the channels, provides a numerical range of failed interactions and a corresponding customer-impact score. In the illustrated embodiment, the normalized-impact score calculator 142 translates the number of failed interactions for each channel 120 and sub-channel 124 into a normalized-impact score based on the normalized-impact scale provided in a table 302 of FIG. 3.

Referring now to FIG. 3, the table 302 of exemplary normalized-impact scores is provided. In an embodiment, the normalized-impact score calculator 142 obtains normalized-impact scores from the table 302. Row 310 includes the range of possible normalized-impact scores, i.e., "1" to "12", and column 314 includes exemplary channels 120 and sub-channels 124. Each of the boxes 316 includes a range of numbers of failed customer interactions. In operation, upon receiving from the respective channels 120 and sub-channels 124 the numbers of failed customer interactions for the day, the normalized-impact score calculator 142 accesses the table 302 to obtain the customer impact score, of column 310, associated with the reported number of failed customer interactions for each channel 120 and sub-channel 124.

For example, if the online banking ("OLB") sub-channel 124, which is represented in row 320, reports 0 to 1,000 failed customer interactions, the normalized-impact score calculator 142 accesses the table 302 and returns a normalized-impact score of "1". If the online banking the OLB sub-channel 124 reports 1,001 to 3,000 failed customer interactions, the normalized-impact score calculator 142 accesses the table 302 and returns a normalized-impact score of "2". Likewise, for example, if the card call center sub-channel 124, which is represented in row 322, reports 0 to 500 failed customer interactions, the normalized-impact score calculator 142 accesses the table 302 and returns a normalized-impact score of "1". If the card call center sub-channel 124 reports 501 to 1,000 failed customer interactions, the normalized-impact score calculator 142 accesses the table 302 and returns a normalized-impact score of "3".

As illustrated in the example above, the card call center sub-channel 124 and the OLB sub-channel 124 can report the same number of failed customer interactions, yet have different normalized-impact scores. For example, if the card call center sub-channel 124 and the OLB sub-channel 124 both had 700 failed customer interactions for the day, the normalized-impact score calculator 142 would indicate that the OLB sub-channel 124 had a normalized impact score of "1" and that the card call center sub-channel 124 had normalized-impact score of "3". This indicates that failed interactions in the card call center sub-channel 124 have more customer impact than failed interactions in the OLB sub-channel 124.

In this example, where the OLB sub-channel 124 was directly compared to the card call center sub-channel 124, the technology systems 126 of the OLB sub-channel 124 performed better than the technology systems 124 of card call center sub-channel 124. Accordingly, the business manager 108 may consider investing new technology dollars to improve the technology systems 126 of the card call center sub-channel 124.

This normalization enables accurate computation of customer-impact measurements, i.e., performance measurements, of the technology systems 126 across all channels 120 and sub-channels 124, and enables embodiments of the present invention to compare and contrast the measured customer impact, i.e., performance, of the technology systems 126 of the respective channels 120 and sub-channels 124. For example, to compare and contrast the customer impact of the technology systems 126 of the OLB sub-channel 124 and the card call center sub-channel 124, a business manager 108 could compare the normalized-impact scores of the respective sub-channels 124, not the number of failed consumer interactions reported by each of the respective channels.

The normalized-impact score calculator 142 is further configured to provide performance indicators for the respective channels 120 and sub-channels 124 based on the normalized-impact scores. In the illustrated embodiment, the normalized-impact score calculator 142 provides three performance indicators: green, yellow, and red. Green indicates that the channel 120 or sub-channel's 124 technology systems 126 are performing well and have low customer impact. Yellow indicates that the technology systems 126 are performing at an acceptable level and have some negative customer impact. And, red indicates that the technology systems 126 are performing poorly and have high negative customer impact.

Green is indicated by the shading at 340, yellow is indicated by the shading at 344, and red is indicated by the shading at 348. This shading is used consistently throughout all of the figures disclosed herein to represent green, yellow, and red.

For example, in operation, after receiving the number of failed interactions and after calculating normalized-impact scores, the normalized-impact score calculator 142 then, using the data provided in table 302 as instructed, assigns a performance indicator to each of the channels 120 and sub-channels 124 on a daily basis. Table 302 instructs the normalized-impact score calculator 142 to assign the color green to normalized-impact scores of "1" to "2", yellow to normalized-impact scores of "3" and "4", and red to normalized-impact scores of "5" to "12".

As discussed in more detail below, an output, e.g., a scorecard, is provided to the business manager 108 via the business-manager terminal 110. The output lists each of the channels 120 and sub-channels 124 and displays a daily performance indicator associated with each of the respective channels 120 and sub-channels 124. In the event a particular channel 120 or sub-channel's 124 technology systems 126 have a "yellow" or "red" performance indicator for a particular day(s), the business manager 108 can then investigate the underperforming technology systems to determine whether to invest technology dollars in that channel 120 or sub-channel 124 to either shore up or replace the underperforming technology systems 126. This provides an efficient way to keep the bank's 104 technology systems 126 on track, because, instead of investing in technology systems 126 as a whole, the business manager 108 can make specific investments where needed.

Turning now to the daily aggregate-score calculator 146, which calculates a daily aggregate-impact score that indicates the overall performance of the bank 104. The daily aggregate-impact score, in one embodiment, is the aggregate of the normalized-impact scores of each of the bank's 104 channels 120 and sub-channels 124, where, before being aggregated, each of the normalized-impact scores is weighted by the previously determined channel-weighting factors. Accordingly, to calculate the daily aggregate-impact score, the daily aggregate-score calculator 146, for each channel 120 and sub-channel 124, multiplies the normalized-impact score by the corresponding channel-weighting factor. This provides a normalized-and-weighted impact score for each of the channels 120 and sub-channels 124. To determine the daily aggregated-impact score, the daily aggregate-score calculator 146 then calculates the sum of the normalized-and-weighted impact scores.

The daily aggregate-score calculator 146 assigns a performance indicator to the calculated daily aggregate-impact scores. In the illustrated embodiment, like the normalized-impact score calculator 142, the daily aggregate-score calculator 146 provides three performance indicators: green, yellow, and red. Green indicates that the bank's 104 technology systems 126, in the aggregate, are performing well and have low customer impact. Yellow indicates that the technology systems 126 are performing at an acceptable level and have some negative customer impact. And, red indicates that the technology systems 126 are performing poorly and have high negative customer impact. In the illustrated embodiment, the daily aggregate-score calculator 146 assigns green to daily-aggregate impact scores of "0" to "2.59", yellow to daily-aggregate impact scores of "2.60" to "3.70", and red to daily-aggregate impact scores of "3.70" or above.

Turning now to the scorecard creator 150, which creates an overall scorecard, such as the scorecard 400 illustrated in FIG. 4. The business manager 108 can access the terminal 110 to view the overall scorecard 400 and quickly obtain information relating to the individual performance of the technology systems 126 of each of the channels 120 and sub-channels 124, as well as information relating to the overall performance of all of the technology systems 126 of the bank 104. As described above, the reported performance of the technology systems 126 is based on the customer impact of the technology systems 126. That is, the scorecard creator 150 provides the business manager 108 with a single scorecard 400 that the business manager 108 can review to gauge the overall performance of the bank's 104 technology systems 126 and to compare and contrast the performance of the respective technology systems 126 of the various channels 120 and sub-channels 124.

The scorecard creator 150, on a daily basis, creates a box 406 for each sub-channel 124. In the illustrated embodiment of FIG. 4, each box 406 is shaded green, yellow, or red to show the performance indicator, which was determined by the normalized-impact score calculator 142, for that particular sub-channel 124 on that particular day. And, each box 406 contains the number of failed customer interactions that occurred in that particular sub-channel 124 on that particular day. Accordingly, the daily number of failed customer interactions and the daily performance indicators for each of the sub-channels 124 are provided in boxes 406.

The scorecard 400 also provides the daily aggregated number of failed interactions across all channels 120 and sub-channels 124 at boxes 410. Here, the scorecard creator 150, on a daily basis, creates a box 410 for the entire bank 104. In the illustrated embodiment, each box 410 is shaded green, yellow, or red to indicate the overall performance of the entire bank 104, which was calculated by the daily aggregate-score calculator 146. This performance indicator, e.g., green, yellow, or red shading, indicates the customer impact of the bank's 104 technology systems 126 in the aggregate. Also, each box 410 contains the total number of failed customer interactions that occurred across all sub-channels 124 on that particular day.

The illustrated scorecard 400, which displays performance information about each of the channels 120 and sub-channels 124 and overall performance information about the entire bank 104, will now be described in more detail. Column 402 lists the channels 120 and column 404 lists the sub-channels 124. Column 440 lists the month-to-date number of customer interactions (successful and failed) for each channel 120, column 444 lists the month-to-date number of failed customer interactions for each channel 120, and columns 446*a-c* list the month-to-date number of red days, yellow days, and green days for each sub-channel 124. And, boxes 448*a-c*, which are located in row 410, provide the month-to-date number of red days, yellow days, and green days for the entire bank 104. Although the illustrated scorecard 400 provides month-to-date information, it should be appreciated that the scorecard 400 could provide year-to-date information, or any other desired time frame, such as ten-years-to-date.

The scorecard 400, according to one embodiment, also provides the percentage of days for the month-to-date that the performance of each of the channels 120 and sub-channels 124 have been green. The percentages are provided at columns 420 and 424, respectively. Also provided, at box 428, is the percentage of days for the month-to-date that performance of the entire bank 104 has been green.

The business manager 108 can quickly glance at the scorecard 400 and, by identifying red or yellow boxes 406, determine which sub-channels' 124 technology systems 126 are underperforming on any given day. By identifying which sub-channels 124 employ underperforming technology systems 126, the business manager 108 can then effectively investigate why the identified technology systems 126 are underperforming and efficiently invest technology dollars to fix or replace the identified technology systems 126, if necessary.

Also, by identifying red or yellow boxes 410, the business manager 108 can determine the days where the bank's 104 technology systems 126, in the aggregate, are underperforming. After identifying those days, the business manager 108 can then identify which boxes 406 were yellow or red on those underperforming days. This enables the business manager 108 to identify the sub-channels 124 that house underperforming technology systems 126 that were responsible for causing the entire bank 104 to underperform.

The business manager 108 can review column 420 to determine the percentage of days where the channels' 120 technology systems 126 were performing in the green. If some channels 120 are underperforming, the business manager 108 can then review column 424 to determine the underperforming sub-channels 124 that caused the identified channels 120 to underperform.

If column 420 indicates that all of the channels 120 have an acceptable percentage of green days, then the business manager 108 knows that the already-invested technology dollars are properly allocated among the various channels 120 and sub-channels 124. However, if some channels 120 are underperforming, the business manager 108 can, by reviewing column 424, determine which sub-channels 124 have an unacceptably low percentage of green days, efficiently allocate additional technology dollars to shore up or replace underperforming technology systems 126.

Referring now to FIG. 5, an exemplary process 500 is provided that illustrates operation of an exemplary customer impact measuring system 100. The customer impact measuring system 100, when executing the exemplary process 500, obtains and analyzes a transaction history of interaction between a bank's 104 customers 128 and its technology systems 126, and, based thereon, reports to a business manager 108 a scorecard 400 that indicates the performance, based on failed customer interactions, of the technology systems 126 of the bank's 104 various channels 120 and sub-channels 124, so that the business manager 108 can efficiently invest technology dollars in the bank's 104 technology systems 126.

As represented by block 504, the channel-weighting factor calculator 138 calculates channel-weighting factors for each of the channels 120 and sub-channels 124. Next, as represented by block 508, each of the channels 120 and sub-channels 124 report to the database 114 the total number of customer interactions and the number of failed customer interactions. Then, as represented by block 512, the scorecard creator 150 retrieves the total number of customer interactions and the total number of failed customer interactions from the database 114 and populates the scorecard 400 with that information. For example, if failed customer interactions are reported by sub-channels 124, the scorecard creator 150 inputs the number of failed interactions into the appropriate boxes 406, and then updates boxes 410 and column 444 to reflect the inputted failed customer interactions. The scorecard creator 150 also updates column 440 to reflect the month-to-date number of customer interactions.

As represented by block 516, the normalized-impact score calculator 142 then calculates normalized-impact scores for each of the channels 120 and sub-channels 124. Then, as represented by block 520, the normalized-impact score calculator 142 determines a performance indicator, e.g., green, yellow, red, for each of the boxes 406 and 410. The scorecard creator 150 updates the scorecard 400 to reflect the determined performance indicators. To do so, for example, the scorecard creator 150 shades each of the boxes 406 green, yellow, or red.

Next, as represented by block 524, the scorecard creator 150 calculates the percentage of days that are green for each of the channels 120 and sub-channels 124. These frequencies, or percentages, are then inputted onto the scorecard 400 at columns 420 and 424. Then, as represented by block 528, the daily aggregate-score calculator 146 then calculates the daily aggregated score for the entire bank 104 and then translates that score into a daily aggregate color of either green, yellow, or red. The scorecard creator 150 then shades boxes 410 of the scorecard 400 the appropriate color.

As will be appreciated by one of skill in the art, embodiments of the invention may include a method (including a business process), system, computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-usable program code embodied in the medium.

Any suitable computer-readable medium may be utilized. The computer-readable medium may be, for example but not limited to, an electronic, magnetic, optical, electromagnetic, infrared, or semiconductor system, apparatus, device, or propagation medium. More specific examples of the computer-readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-readable medium may be any medium that can contain, store, communicate, propagate, or transport the program for use by or in connection with the instruction execution system, apparatus, or device. The computer-readable medium may include a propagated data signal with the computer-usable program code embodied therewith, either in baseband or as part of a carrier wave. The computer-usable program code may be transmitted using any appropriate medium, including but not limited to the Internet, wireline, optical fiber cable, radio frequency (RF) signals, or other mediums.

Computer program code for carrying out operations of embodiments of the present invention may be written in an object-oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatuses (systems), and computer program products. It will be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A computer-implemented method for measuring the performance of a company's technology systems, the company comprising at least two channels and each of the channels employs a technology system, the method comprising:
   weighting the importance of each of the channels;
   providing anon-transitory computer-readable medium comprising computer program code stored thereon, wherein said computer program code is specifically configured to cause a computer processing device to perform the following operations when performing the computer program code:
   receiving a number of failed interactions, wherein each of the failed interactions represents an instance where the technology system of one of the channels failed to properly execute; and
   normalizing a magnitude of customer impact resulting from the failed interactions based on the channel in which the failed interactions occurred, wherein normalizing the magnitude of customer impact comprises:
      providing a normalized-impact scale for each of the at least two channels, wherein the normalized-impact scale comprises a plurality of non-overlapping numerical ranges of failed interactions for a channel, wherein each of the plurality of non-overlapping numerical ranges corresponds to a different one of a plurality of customer-impact scores; and
      determining a normalized-impact score for each channel based at least partially on the normalized-impact scale and the number of failed interactions.

2. The computer-implemented method of claim 1, wherein the performance of the company's technology systems is measured on a daily basis.

3. The computer-implemented method of claim 1, wherein the magnitude of customer impact is the extent of negative impact on a customer of the company caused by the failed interactions.

4. The computer-implemented method of claim 1, wherein weighting the importance of each of the channels comprises:
   assigning a channel-weighting factor to each of the channels, wherein the channel-weighting factors reflect the relative importance of the channels to the company.

5. The computer-implemented method of claim 1, wherein the normalized-impact scores account for the disparity of the magnitude of customer impact across the different channels resulting from failed interactions.

6. The computer-implemented method of claim 1, further comprising computer readable medium comprising instruction code structured to cause the computer processing device to:
   determining a performance indicator for each of the channels based on the normalized-impact score of the respective channels.

7. The computer-implemented method of claim 6, wherein the performance indicator is a color.

8. The computer-implemented method of claim 7, wherein the performance indicator is green when the normalized-impact score for the channel is low, which indicates that a low number of failed interactions occurred in the channel and that the technology system of the channel is performing at a high level.

9. The computer-implemented method of claim 7, wherein the performance indicator is yellow when the normalized-impact score for the channel is medium, which indicates that a medium number of failed interactions occurred in the channel and that the technology system of the channel is performing at a medium level.

10. The computer-implemented method of claim 7, wherein the performance indicator is red when the normalized-impact score for the channel is high, which indicates that a high number of failed interactions occurred in the channel and that the technology system of the channel is performing at a low level.

11. The computer-implemented method of claim 6, further comprising computer readable medium comprising instruction code structured to cause the computer processing device to:
   calculating an aggregate-impact score that reflects the overall performance of the technology systems of all of the channels of the company.

12. The computer-implemented method of claim 11, wherein the aggregate-impact score is the sum of the product of the normalized-impact score and the channel-weighting factor of each of the channels.

13. The computer-implemented method of claim 11, further comprising computer readable medium comprising instruction code structured to cause the computer processing device to:
   providing an overall performance indicator for the technology systems of the company, wherein the overall performance indicator is based on the aggregate-impact score.

14. The computer-implemented method of claim 11, further comprising computer readable medium comprising instruction code structured to cause the computer processing device to:
   calculating the percentage of days per month that the performance indicator is green for each channel.

15. The computer-implemented method of claim 14, further comprising computer readable medium comprising instruction code structured to cause the computer processing device to:
   creating a scorecard that presents the overall performance of the technology systems of the company.

16. The computer-implemented method of claim 15, wherein the scorecard presents the number of failed interactions for each channel, the performance indicator for each channel, and the percentage of days per month that the performance indicator is green for each channel.

17. The computer-implemented method of claim 15, wherein the scorecard presents the number of failed interactions for the company, the performance indicator for the company, and the percentage of days per month that the performance indicator is green for the company.

18. An apparatus for measuring the performance of a company's technology systems, the company comprising at least two channels and each of the channels employs a technology system, the apparatus comprising:
  a computer processing device;
  a storage device comprising computer instruction code configured to cause said computer processing device to perform the following operations when said computer instruction code is operated by said computer processing device:
    use a channel-weighting factor calculator to weight the importance of each of the channels;
    use a database to receive a number of failed interactions, wherein each of the failed interactions represents an instance where the technology system of one of the channels failed to properly execute; and
    use a normalized-impact score calculator to normalize a magnitude of customer impact resulting from the failed interactions based on the channel in which the failed interactions occurred, wherein normalizing the magnitude of customer impact comprises:
      providing a normalized-impact scale for each of the at least two channels, wherein the normalized-impact scale comprises a plurality of non-overlapping numerical ranges of failed interactions for a channel, wherein each of the plurality of non-overlapping numerical ranges corresponds to a different one of a plurality of customer-impact scores; and
      determining a normalized-impact score for each channel based at least partially on the normalized-impact scale and the number of failed interactions.

19. The apparatus of claim 18, wherein the computer processing device measures the performance of the company's technology systems on a daily basis.

20. The apparatus of claim 18, wherein the magnitude of customer impact is the extent of negative impact on a customer of the company caused by the failed interactions.

21. The apparatus of claim 18, wherein a channel-weighting factor calculator is configured to assign a channel-weighting factor to each of the channels, wherein the channel-weighting factors reflect the relative importance of the channels to the company.

22. The apparatus of claim 21, wherein the normalized-impact scores account for the disparity of the magnitude of customer impact across the different channels resulting from failed interactions.

23. The apparatus of claim 21, wherein the normalized-impact score calculator is further configured to determine a performance indicator for each of the channels based on the normalized-impact score of the respective channels.

24. The apparatus of claim 23, wherein the performance indicator is a color.

25. The apparatus of claim 21, further comprising an aggregate-impact score calculator configured to calculate an aggregate-impact score that reflects the overall performance of the technology systems of all of the channels of the company.

26. The apparatus of claim 25, wherein the aggregate-impact score calculator is further configured to provide an overall performance indicator for the technology systems of the company, wherein the overall performance indicator is based on the aggregate-impact score.

27. The apparatus of claim 25, further comprising a scorecard creator configured to calculate the percentage of days per month that the performance indicator is green for each channel.

28. The apparatus of claim 25, further comprising a scorecard creator configured to create a scorecard that presents the overall performance of the technology systems of the company.

29. The apparatus of claim 28, wherein the scorecard presents the number of failed interactions for each channel, the performance indicator for each channel, and the percentage of days per month that the performance indicator is green for each channel.

30. The apparatus of claim 28, wherein the scorecard presents the number of failed interactions for the company, the performance indicator for the company, and the percentage of days per month that the performance indicator is green for the company.

31. A computer program product for measuring the performance of a company's technology systems, the company comprising at least two channels and each of the channels employs a technology system, the computer program product comprising a non-transitory computer-readable medium having computer-readable program instructions stored therein, wherein said computer-readable program instructions comprise:
  instructions configured to weight the importance of each of the channels;
  instructions configured to transmit a number of failed interactions to a database, wherein each of the failed interactions represents an instance where the technology system of one of the channels failed to properly execute; and
  instructions configured to normalize a magnitude of customer impact resulting from the failed interactions based on the channel in which the failed interactions occurred comprising:
    instructions configured to provide a normalized-impact scale for each of the at least two channels, wherein the normalized-impact scale comprises a plurality of non-overlapping numerical ranges of failed interactions for a channel, wherein each of the plurality of non-overlapping numerical ranges corresponds to a different one of a plurality of customer-impact scores; and
    instructions configured to determine a normalized-impact score for each channel based at least partially on the normalized-impact scale and the number of failed interactions.

32. The computer program product of claim 31, wherein the first instructions are configured to assign a channel-weighting factor to each of the channels, wherein the channel-weighting factors reflect the relative importance of the channels to the company.

33. The computer program product of claim 32, wherein the instructions configured to normalize a magnitude are further configured to determine a performance indicator for each of the channels based on the normalized-impact score of the respective channels.

34. The computer program product of claim 33, further comprising fourth instructions configured to calculate an aggregate-impact score that reflects the overall performance of the technology systems of all of the channels of the company.

35. The computer program product of claim 34, wherein the instructions configured to calculate the aggregate-impact score are further configured to provide an overall performance indicator for the technology systems of the company, wherein the overall performance indicator is based on the aggregate-impact score.

36. The computer program product of claim 35, further comprising instructions configured to create a scorecard that presents the overall performance of the technology systems of the company.

37. The computer program product of claim 36, wherein the scorecard presents the number of failed interactions for each channel, the performance indicator for each channel, and a percentage of days per month that the performance indicator is green for each channel.

38. The computer program product of claim 37, wherein the scorecard presents the number of failed interactions for the company, the performance indicator for the company, and a percentage of days per month that the performance indicator is green for the company.

39. A system for measuring the performance of a company's technology systems, the company comprising at least two channels and each of the channels employs a technology system, the system comprising:
- an input system configured to receive a number of failed interactions, wherein each of the failed interactions represents an instance where the technology system of one of the channels failed to properly execute;
- a storage device comprising computer instruction code configured to cause one or more computer processing device to measure the performance of the company's technology systems;
- a first computer processing system configured to operate instruction code stored in the storage device to weight the importance of each of the channels; and
- a second computer processing system configured to operate instruction code stored in the storage device to normalize a magnitude of customer impact resulting from the failed interactions based on the channel in which the failed interactions occurred, wherein normalizing the magnitude of customer impact comprises:
  - providing a normalized-impact scale for each of the at least two channels, wherein the normalized-impact scale comprises a plurality of non-overlapping numerical ranges of failed interactions for a channel, wherein each of the plurality of non-overlapping numerical ranges corresponds to a different one of a plurality of customer-impact scores; and
  - determining a normalized-impact score for each channel based at least partially on the normalized-impact scale and the number of failed interactions.

40. The system of claim 39, wherein the first processing system is configured to assign a channel-weighting factor to each of the channels, wherein the channel-weighting factors reflect the relative importance of the channels to the company.

41. The system of claim 40, wherein the second processing system is further configured to determine a performance indicator for each of the channels based on the normalized-impact score of the respective channels.

42. The system of claim 41, further comprising a third processing system configured to calculate an aggregate-impact score that reflects the overall performance of the technology systems of all of the channels of the company.

43. The system of claim 42, wherein the third processing system is further configured to provide an overall performance indicator for the technology systems of the company, wherein the overall performance indicator is based on the aggregate-impact score.

44. The system of claim 43, further comprising a fourth processing system configured to create a scorecard that presents the overall performance of the technology systems of the company.

45. The system of claim 44, wherein the scorecard presents the number of failed interactions for each channel, the performance indicator for each channel, and a percentage of days per month that the performance indicator is green for each channel.

46. The system of claim 45, wherein the scorecard presents the number of failed interactions for the company, the performance indicator for the company, and a percentage of days per month that the performance indicator is green for the company.

47. An apparatus for measuring the performance of a company's technology systems, the company comprising at least two channels and each of the channels employs a technology system, the apparatus comprising:
- a computer processing device;
- a storage device comprising computer instruction code configured to cause said computer processing device to perform the following operations when said computer instruction code is operated by said computer processing device:
- use a channel-weighting factor calculator to weight the importance of each of the channels by assigning a channel-weighting factor to each of the channels, wherein the channel-weighting factors reflect the relative importance of the channels to the company;
- use a database to receive a number of failed interactions, wherein each of the failed interactions represents an instance where the technology system of one of the channels failed to properly execute; and
- use a normalized-impact score calculator to normalize a magnitude of customer impact resulting from the failed interactions based on the channel in which the failed interactions occurred, wherein normalizing the magnitude of customer impact comprises:
  - providing a normalized-impact scale for each of the at least two channels, wherein the normalized-impact scale comprises a plurality of non-overlapping numerical ranges of failed interactions for a channel, wherein each of the plurality of non-overlapping numerical ranges corresponds to a different one of a plurality of customer-impact scores; and
  - determining a normalized-impact score for each channel based at least partially on the normalized-impact scale and the number of failed interactions.

* * * * *